United States Patent [19]
Glance et al.

[11] Patent Number: 5,367,586
[45] Date of Patent: Nov. 22, 1994

[54] OPTICAL DELAY LINE

[75] Inventors: Bernard Glance, Colts Neck; Robert W. Wilson, Holmdel, both of N.J.

[73] Assignee: AT&T Bell Laboratories, Murray Hill, N.J.

[21] Appl. No.: 38,589

[22] Filed: Mar. 26, 1993

[51] Int. Cl.[5] .............................................. G02B 6/28
[52] U.S. Cl. ........................................ 385/24; 385/27; 385/37; 385/46; 359/114; 359/130
[58] Field of Search ................. 385/24, 27, 37, 39, 385/46; 359/113, 114, 124, 127, 130

[56] References Cited

U.S. PATENT DOCUMENTS

| | | | |
|---|---|---|---|
| 4,890,893 | 1/1990 | Smoot | 385/24 |
| 5,002,350 | 3/1991 | Dragone | 385/37 |
| 5,101,455 | 3/1992 | Goutzoulis | 385/24 |
| 5,125,051 | 6/1992 | Goutzoulis et al. | 385/27 |
| 5,136,671 | 8/1992 | Dragone | 385/46 |
| 5,191,627 | 3/1993 | Haas et al. | 385/24 |
| 5,243,672 | 9/1993 | Dragone | 385/46 |

OTHER PUBLICATIONS

"High Performance Optical Wavelength Shifter", B. Glance et al., *Electronics Letters*, 27 Aug. 1992, vol. 28 No. 18, pp. 1714–1715.

P. Gavignet-Morin, et al. "Multiwavelength Optical Buffer Based On Fiber Delay Lines...", *Optical Society of America 100C'93 Conference*, Feb. 21-26, 1993, San Jose, Calif. pp. 145-146.

*Primary Examiner*—Frank Gonzalez
*Attorney, Agent, or Firm*—Eli Weiss

[57] ABSTRACT

A variable optical delay line which can delay an optical signal by a selected interval of time comprises an input wavelength router connected to an output wavelength router by means of optical waveguides of different lengths. A wavelength shifter coupled to the input of the input wavelength router shifts the wavelength of the received signal to a desired wavelength. Depending on the wavelength of the signal from the wavelength shifter, the received signal is directed to a specific one of the waveguides of different lengths to provide a delay which is controllable. The output wavelength router directs the optical signals from the various waveguides of different lengths to a common output waveguide.

7 Claims, 2 Drawing Sheets

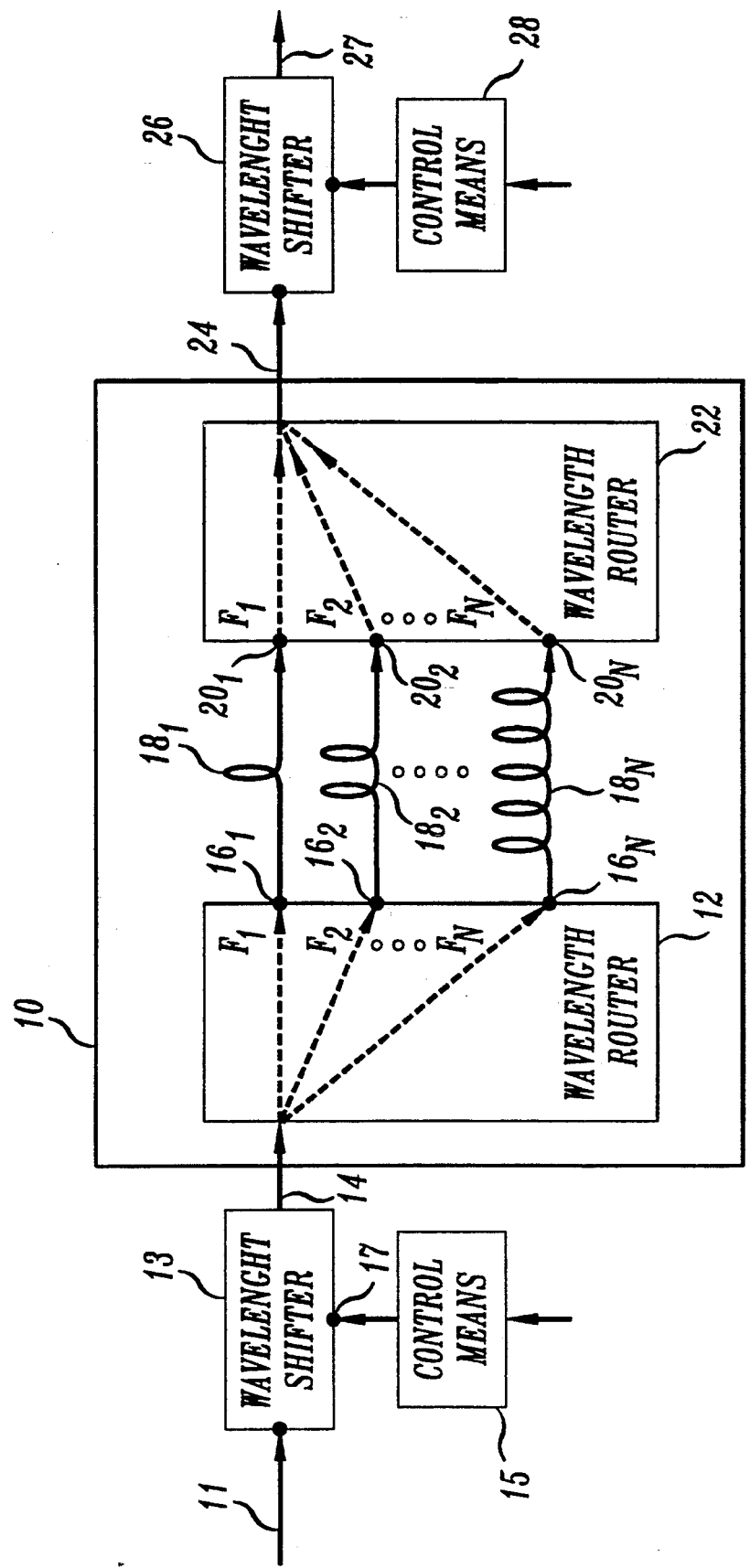

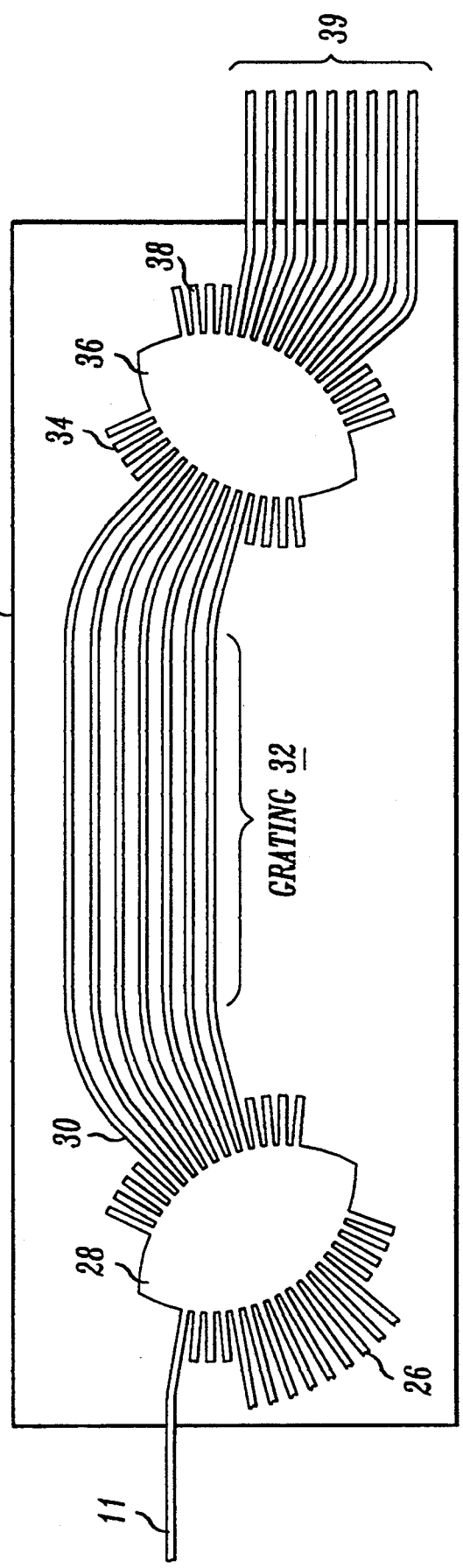

OPTICAL DELAY LINE

TECHNICAL FIELD

This invention relates to optical communications system. More particularly, this invention relates to optical delay lines which are variable and can be used in optical communications systems.

BACKGROUND OF THE INVENTION

Present day commercial lightwave systems use optical fibers to carry large amounts of multiplexed information over long distances from one location to another. Many transmission lines such as inter-office and intra-office links, local area networks (LAN) and metropolitan area networks (MAN) are optical and, therefore, the information that is being transmitted is carried over an optical fiber. A major advantage of transmitting information in optical form is the very large bandwidth and low losses associated with single mode optical fiber.

In a communication network, it is normally required that signals from many transmission lines be cross-connected or switched to other transmission lines to provide flexibility and to permit traffic from one transmission line to be rerouted to different destinations.

Various architectures that are being investigated for use in photonic switching in the time domain involve either fiber-loop or fiber-delay-line optical buffering. In an article in OFC/IOOC '93 Technical Digest by P. Gavignet-Mofin et al., there is disclosed a high-capacity optical buffer based on a set of fiber delay lines that realize in the photonic domain the equivalent of an electronic multibuffer shift register with variable delays for packet storage and time-switching applications in broad-band optical networks.

Until now, there has been no convenient approach to providing an optical delay line which can provide a variable delay and is economical to implement.

SUMMARY OF THE INVENTION

In accordance with this invention, a variable optical delay line has been developed. The variable delay line in accordance with this invention may be based upon photonic integrated circuitry which can provide a large range of time delay to an optical signal, and this can be realized at a relatively low cost.

In one example of the invention, the inventors have realized that integrated optical devices disclosed, for example, in U.S. Pat. Nos. 5,002,350 and 5,136,671 may be used to create a variable optical delay line having a wide range of delays. In specific terms, the invention which is here disclosed comprises two identical 1XN wavelength routing devices interconnected with optical waveguides. Each of the interconnecting optical waveguides has a specific length which is different from the length of the other waveguides. The 1XN wavelength routing device connected to receive the incoming optical signal which is to be delayed can be considered to have at least one input port and a plurality of output ports where a signal of a specific wavelength that is received by the input port will be directed to a specific one of the plurality of output ports. In operation, it is the wavelength of the input signal that determines which one of the output ports will receive the input signal.

A wavelength shifter is coupled to the input waveguide of the first or input wavelength routing device to shift the wavelength of a received optical signal to another wavelength. Depending on the wavelength of the signal from the shifter, the received optical signal is directed by the input wavelength routing device to a specific one of the interconnecting optical waveguides, and, therefore, to a waveguide of a specific length which provides the desired controllable delay. The second wavelength routing device directs optical signals from each of the various optical waveguides of different lengths to a common output waveguide. A second wavelength shifter can be connected to the common output waveguide of the second wavelength routing device to shift the optical output signal back to its original wavelength.

BRIEF DESCRIPTION OF THE DRAWING

FIG. 1 is a diagram of an example of an optical variable delay line; and

FIG. 2 is a diagram illustrating the details of the frequency routing devices of FIG. 1.

DETAILED DESCRIPTION

FIG. 1 illustrates an example of a variable optical delay line which can provide a wide range of delays in accordance with the principles of the invention. The variable delay line is composed of two frequency routing devices, interconnected with optical waveguides of different lengths and a controllable wavelength shifter at the input of the device. These structures may be monolithically integrated either partially or fully on a semiconductive wafer and formed by means of known photolithographic techniques.

In the instance where the structure is fully integrated, the delays which are obtainable are limited by the size of the wafer. More delay flexibility is obtainable by using a partially integrated structure where optical fibers are used for obtaining the delay.

FIG. 1 illustrates a wafer 10 made of a semiconductive material such as an indium phosphide based material such as InGaAsP. An optical signal of a known wavelength is directed via an input optical waveguide 11 to a wavelength shifter 13 which shifts the frequency of the received optical signal from its received wavelength to a second wavelength. The optical wavelength signal from the wavelength shifter is carried by waveguide 14 to a first input wavelength router 12 defined on the wafer 10. Depending on the wavelength of the signal from the wavelength shifter 13, the wavelength router 12 may receive N input optical wavelengths $F_1, F_2, \ldots F_N$ on the single input waveguide 14 defined on wafer 10. The first wavelength router 12 receives and directs the input optical wavelength to an appropriate output port $16_1, 16_2, \ldots 16_N$ of the wavelength router 12. Specifically, a signal of wavelength $F_1$ received by input waveguide 14 is directed to the output port $16_1$, a signal of wavelength $F_2$ is directed to the output port $16_2$, and so on up to a signal of wavelength $F_N$ which is directed to output port $16_N$.

Each of the output ports $16_1, 16_2, \ldots 16_N$ is connected to an appropriate input port $20_1, 20_2, \ldots 20_N$ of a second wavelength router 20 via waveguides $18_1, 18_2, \ldots 18_N$ of unequal lengths. The waveguides $18_1, 18_2, \ldots 18_N$ of unequal lengths provide a predetermined amount of path length difference to the optical signals from the different output ports $16_1, 16_2, \ldots 16_N$ and, therefore, these waveguides provide different time delays to signals that they carry.

The waveguides $18_1, 18_2, \ldots 18_N$ can be formed on the wafer 10 by selectively doping narrow elongated portions of the wafer or they can be various lengths of individual optical fibers. The details of creating such waveguides in a wafer such as the indium phosphide wafer 10 illustrated in FIG. 1 are generally known and are not a part of this invention. Thus, they are not described here.

Specifically in FIG. 1, a signal of a first wavelength received on waveguide 11 is shifted to a signal of a second wavelength by wavelength shifter 13. The wavelength shift that is applied to the received optical signal determines the path that the signal takes in going through the wavelength routers 12, 22 and the waveguides $18_1, 18_2, \ldots 18_N$ and, therefore, the amount of delay that the signal will experience. Depending upon the value of the control signal applied to the control port 17 of wavelength shifter 13 by control means 15, the wavelength signal on waveguide 11 may be shifted over a 50 nm bandwidth in the 1.5 μm region. A wavelength shifter suitable for shifting a wavelength signal is disclosed in the *Electronics Letters*, Aug. 27, 1992, Vol. 28, No. 18, by B. Glance et al., entitled "High Performance Optical Wavelength Shifter". The wavelength shifter disclosed in this publication is based on the gain-saturation effect in a semiconductor optical amplifier. It can transfer multigigabit data streams between two or more wavelengths, tunable over a 50 nm bandwidth in the 1.5 μm region. It also provides conversion gain and is cascadable, while causing negligible signal degradation. The disclosed wavelength shifter provides a shift in wavelength by copying data onto signals at different wavelengths. Data copying is based on the well-known gain saturation induced cross-talk effect which is usually avoided as a nuisance in conventional optical amplification, but carded to its extreme in this instance. The use of this effects limits the modulation format to digital intensity modulation. Within this constraint, the result is the same as a wavelength shift.

The wavelength shifter 13 is coupled via input waveguide 14 to the first wavelength router 12. The path of the wavelength signal through the first wavelength router 12 is determined by the wavelength of the signal on waveguide 14. Specifically, an input signal of wavelength $F_1$ on waveguide 14 is directed by wavelength router 12 to output port $16_1$, an input signal of wavelength $F_2$ is directed to output port $16_2$, and so on up to an input signal of wavelength of $F_N$ which is directed to output port $16_N$. Each of the output ports $16_1, 16_2, \ldots 16_N$ is connected to an optical waveguide which has a different predetermined length. In this invention, an optical signal that is to have a long delay is directed to an optical waveguide that is relatively long such as waveguide $18_N$ while an optical signal that is to have a shorter delay is directed to an optical waveguide that is relatively shorter such as waveguide $18_2$.

Continuing with FIG. 1, output port $16_1$ is connected to the input of a waveguide $18_1$ of a first length, output port $16_2$ is connected to the input of a waveguide $18_2$ of a second length which is longer than waveguide $18_1$, and so on up to output port $16_N$ which is connected to the input of a waveguide $18_N$ of a length which is a waveguide of the longest length.

The outputs of the waveguides $18_1, 18_2, \ldots 18_N$ are connected to respective input ports $20_1, 20_2, \ldots 20_N$ of a second frequency router 22. Frequency router 22 redirects the signal which appears at the N input ports $20_1, 20_2, \ldots 20_N$ onto a single output waveguide 24. If desired, a second wavelength shifter 26, which is controlled by control means 28, can be connected to shift the wavelength of the signal on the output waveguide 24 back to the wavelength of the signal initially received on input optical waveguide 11. The path $18_1, 18_2, \ldots 18_N$ that the signal takes in going from the first or input wavelength router 12 to the output wavelength router 22 is determined by the wavelength of the signal. Thus, as each waveguide $18_1, 18_2, \ldots 18_N$ has a different length, the time that it takes for a signal to travel from the input waveguide 11 to the output waveguide 27 is determined by the wavelength of the signal from the wavelength shifter 13. With this invention, the time delay that a signal experiences is going from an input waveguide to an output waveguide is controlled by controlling the wavelength of the signal.

FIG. 2 shows the pertinent details of the wavelength routers 12 and 22 illustrated in FIG. 1. The wavelength routers may have identical configurations. Each wavelength routers contains a plurality of input ports 26 connected via input waveguides to a free region 28. A plurality of output ports 30 connected to waveguides extend from the free space region 28 and is connected to an optical grating 32. The optical grating 32 comprises a plurality of unequal length waveguides which provides a predetermined amount of path length difference to a corresponding plurality of input ports 34 connected to waveguides connected to another free space region 36. The free space region 36 is connected to a plurality of output ports 38 connected to waveguides 39. The details of their construction and operation are more fully described in U.S. Pat. Nos. 5,002,350 and 5,136,671, the entire contents of which are hereby incorporated by reference into this application. In the case of the wavelength router 12, one of the input ports 26 is connected to the input waveguide 14 of the device shown in FIG. 1, and the plurality of waveguides 39 connected to output ports 38 are used as the output ports $16_1, 16_2, \ldots 16_N$. In the case of the frequency routing device 22, the plurality of input ports 26 connected to waveguides are the input ports $20_1, 20_2, \ldots 20_N$ shown in FIG. 1 and one of the output waveguides 39 is the output waveguide 24 shown in FIG. 1.

The device of FIG. 1 may be tuned to a large number of different optical wavelengths used in high speed, high capacity optical communications networks. For example, frequency routing devices where N is equal to 32 or more may be conveniently fabricated on a single semiconductive wafer. In accordance with the principles of this invention, this results in an optical delay line which can provide up to 32 or more different delays to a received signal.

It will thus be appreciated that those skilled in the art will be able to devise numerous arrangements which, although not explicitly shown or described herein, embody the principles of the inventions. Accordingly, all such alternatives, modifications and variations which fall within the spirit and broad scope of the appended claims will be embraced by the principles of the invention.

We claim:

1. A variable optical delay line comprising
   a wavelength shifter for changing the wavelength of a received optical signal,
   an input wavelength routing device for receiving the signal from the wavelength shifter, said input wavelength routing device having a plurality of output ports, an output wavelength routing device having a plurality of input ports and at least one output port, and optical waveguides interposed between the output ports of the input wavelength routing device and the input ports of the output wavelength routing device.

2. The variable optical delay line of claim 1 wherein the optical waveguides interposed between the output ports of the input wavelength routing device and the input ports of the output wavelength routing device are of different lengths.

3. The variable optical delay line of claim 2, further comprising:

control means coupled to the wavelength shifter to change the wavelength of the received optical signal to cause the received optical signal to travel through a desired one of the waveguides of different lengths to provide a desired delay to the optical signal by controlling the wavelength of the received optical signal.

4. The variable optical delay line of claim 2, in which the input frequency routing device comprises at least one input port coupled to a waveguide;

a first free space region connected to the waveguide coupled to the at least one input port;

a plurality of output ports coupled to waveguides connected to the first free space region;

an optical grating connected to the waveguides coupled to the plurality of output ports comprising a plurality of unequal length waveguides;

a plurality of input ports coupled to waveguides connected to the optical grating;

a second free space region connected to the waveguides connected to the plurality of input ports connected to the optical grating; and a plurality of output ports coupled to waveguides connected to the second free space region.

5. The variable optical delay line of claim 1, in which the output wavelength routing device comprises:

a plurality of input waveguides;

a first free space region connected to the plurality of input waveguides;

a plurality of output waveguides connected to the first free space region;

an optical grating connected to the plurality of output waveguides comprising a plurality of unequal length waveguides;

a plurality of input waveguides connected to the optical grating;

a second free space region connected to the plurality of input waveguides connected to the optical grating; and at least one output waveguide connected to the second free space region.

6. The variable optical delay line of claim 4, in which the output wavelength routing device comprises:

a plurality of input waveguides;

a first free space region connected to the plurality of input waveguides;

a plurality of output waveguides connected to the first free space region:

an optical grating connected to the plurality of output waveguides comprising a plurality of unequal length waveguides;

a plurality of input waveguides connected to the optical grating;

a second free space region connected to the plurality of input waveguides connected to the optical grating; and at least one output waveguide connected to the second free space region.

7. The variable optical delay line of claim 6, in which each of the plurality of output waveguides of the input wavelength routing devices are connected to a respective one of the plurality of input waveguides of the output frequency routing device by means of one of the waveguides of different lengths.

* * * * *